United States Patent
Jung et al.

(10) Patent No.: US 12,223,249 B2
(45) Date of Patent: Feb. 11, 2025

(54) ETCH-MODELING SYSTEM AND METHOD OF MANUFACTURING SEMICONDUCTOR DEVICE USING THE SAME

(71) Applicant: Samsung Electronics Co., Ltd., Suwon-si (KR)

(72) Inventors: Kang-Min Jung, Seoul (KR); Kyo Il Koo, Hwaseong-si (KR); Sang-Wook Park, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 616 days.

(21) Appl. No.: 17/522,185

(22) Filed: Nov. 9, 2021

(65) Prior Publication Data
US 2022/0207228 A1  Jun. 30, 2022

(30) Foreign Application Priority Data
Dec. 29, 2020 (KR) .................. 10-2020-0185782

(51) Int. Cl.
*G06F 30/392* (2020.01)
*G06F 30/398* (2020.01)
*G06F 119/18* (2020.01)

(52) U.S. Cl.
CPC .......... *G06F 30/392* (2020.01); *G06F 30/398* (2020.01); *G06F 2119/18* (2020.01)

(58) Field of Classification Search
CPC .............................. G06F 30/392; G06F 30/398
(Continued)

(56) References Cited

U.S. PATENT DOCUMENTS 6,954,911 B2  10/2005  Pierrat
8,255,838 B2   8/2012  Xue et al.
(Continued)

FOREIGN PATENT DOCUMENTS

JP         5356089 B2   12/2013
JP      2016-038550 A    3/2016
(Continued)

*Primary Examiner* — Jack Chiang
*Assistant Examiner* — Suchin Parihar
(74) *Attorney, Agent, or Firm* — Harness, Dickey & Pierce, P.L.C.

(57) ABSTRACT

Provided is a method of manufacturing a semiconductor device. the method comprises receiving layout data including a plurality of pieces of pattern data, the plurality of pieces of pattern data having through first to $N^{th}$ unique patterns (N is a natural number greater than or equal to two), calculating first to $N^{th}$ density values of the first to $N^{th}$ unique patterns from the layout data and calculating first to $N^{th}$ populations of the first to $N^{th}$ unique patterns from the layout data, performing sampling by selecting some unique patterns among the first to $N^{th}$ unique patterns, the selecting based on the first to $N^{th}$ density values and the first to $N^{th}$ populations, and performing etch modeling on sampled patterns of the plurality of pieces of pattern data, the sampled patterns corresponding to the selected unique patterns.

20 Claims, 18 Drawing Sheets

(58) Field of Classification Search
USPC .......................................................... 716/52
See application file for complete search history.

(56) References Cited

U.S. PATENT DOCUMENTS

| | | |
|---|---|---|
| 8,762,901 B2 | 6/2014 | Lee et al. |
| 10,197,908 B2 | 2/2019 | Sriraman et al. |
| 10,527,929 B2 | 1/2020 | Jeong |
| 10,534,257 B2 | 1/2020 | Tetiker et al. |
| 10,691,016 B2 | 6/2020 | Shim |
| 11,733,603 B2 * | 8/2023 | Kim .................... H01L 21/027 438/689 |
| 11,755,814 B2 * | 9/2023 | Chen .................... G06F 30/398 716/102 |
| 2018/0157161 A1 * | 6/2018 | Mailfert ................ G06F 30/367 |
| 2021/0048751 A1 * | 2/2021 | Shi ...................... G03F 7/70516 |
| 2022/0100935 A1 * | 3/2022 | Chen .................... G03F 7/705 |
| 2022/0155695 A1 * | 5/2022 | Moon .................... G06N 3/045 |
| 2023/0081446 A1 * | 3/2023 | Narayanan .............. G06F 30/20 703/12 |
| 2023/0100578 A1 * | 3/2023 | Cao .................... G03F 7/70441 716/53 |

FOREIGN PATENT DOCUMENTS

| | | |
|---|---|---|
| KR | 10-2007-0109117 A | 11/2007 |
| KR | 10-2009-0069093 A | 6/2009 |
| KR | 10-2019-0117710 A | 10/2019 |

\* cited by examiner

ETCH-MODELING SYSTEM AND METHOD OF MANUFACTURING SEMICONDUCTOR DEVICE USING THE SAME

CROSS-REFERENCE TO RELATED APPLICATIONS

This application claims priority under 35 U.S.C. § 119 from Korean Patent Application No. 10-2020-0185782 filed on Dec. 29, 2020 in the Korean Intellectual Property Office, the disclosure of which is incorporated herein by reference in its entirety.

BACKGROUND

Some example embodiments relate to an etch-modeling system and/or a method of fabricating a semiconductor device using the same.

In order to achieve high integration and/or high-efficiency operations of a semiconductor device, research is being conducted to refine patterns and form and arrange other fine patterns on the basis of the refined patterns, during the manufacturing and fabrication process of a semiconductor device.

In order to increase the reliability of a semiconductor device, it may be important to model each of a photolithography process and an etching process for forming fine patterns and accurately estimate results of performing the processes before the processes are performed.

Particularly, in the case of modeling an etching process, it may be desirable to generate an etching model on the basis of surroundings which are similar to those of patterns to be actually etched. However, it may be difficult to form a pattern for model generation between actual patterns, and in terms of cost and/or efficiency, it is inappropriate to newly fabricate or generate a mask for modeling.

SUMMARY

Some example embodiments provide an etch-modeling system of which the reliability and efficiency are increased by sampling actual patterns and modeling etching on the basis of the sampling.

Alternatively or additionally, some example embodiments provide a method of fabricating a semiconductor device employing etch modeling of which the reliability and efficiency are increased by sampling actual patterns and modeling etching on the basis of the sampling.

It should be noted that objects of inventive concepts are not limited to the above-described objects, and other objects which have not been mentioned will be apparent to those of ordinary skill in the art from the following descriptions.

According to some example embodiments, there is provided a method of manufacturing a semiconductor device including receiving layout data including a plurality of pieces of pattern data, the plurality of pieces of pattern data having through first to $N^{th}$ unique patterns (N is a natural number greater than or equal to two), calculating first to $N^{th}$ density values of the first to $N^{th}$ unique patterns from the layout data and calculating first to $N^{th}$ populations of the first to $N^{th}$ unique patterns from the layout data, performing sampling by selecting some unique patterns among the first to $N^{th}$ unique patterns, the selecting based on the first to $N^{th}$ density values and the first to $N^{th}$ populations, and performing etch modeling on sampled patterns of the plurality of pieces of pattern data, the sampled patterns corresponding to the selected unique patterns.

According to some example embodiments, there is provided a method of manufacturing a semiconductor device including receiving an after cleaning inspection (ACI) scanning electron microscope (SEM) image of a plurality of patterns, the plurality of patterns having first to $N^{th}$ unique patterns (N is a natural number greater than or equal to two), performing sampling by selecting some unique patterns from among the first to $N^{th}$ unique patterns, extracting edge placement (EP) data, the EP data corresponding to an edge of the ACI SEM image, the extracting from sampled patterns of the plurality of patterns corresponding to the selected unique patterns, and performing etch modeling on the EP data.

According to some example embodiments, there is provided an etch-modeling system including a layout processing system configured to provide layout data including a plurality of pieces of pattern data, the plurality of pieces of pattern data including first to $N^{th}$ unique patterns (N is a natural number greater than or equal to two), and processing circuitry configured to calculate first to $N^{th}$ density values of the first to $N^{th}$ unique patterns and first to $N^{th}$ populations of the first to $N^{th}$ unique patterns by receiving the layout data, to perform sampling by selecting some unique patterns among the first to $N^{th}$ unique patterns based on the first to $N^{th}$ density values and on the first to $N^{th}$ populations, and to perform etch modeling on sampled patterns of the plurality of pieces of pattern data corresponding to the selected unique patterns.

BRIEF DESCRIPTION OF THE DRAWINGS

The above and other aspects and features of inventive concepts will become more apparent by describing some example embodiments thereof in detail with reference to the attached drawings, in which.

DETAILED DESCRIPTION OF SOME EXAMPLE EMBODIMENTS

Figure 1:
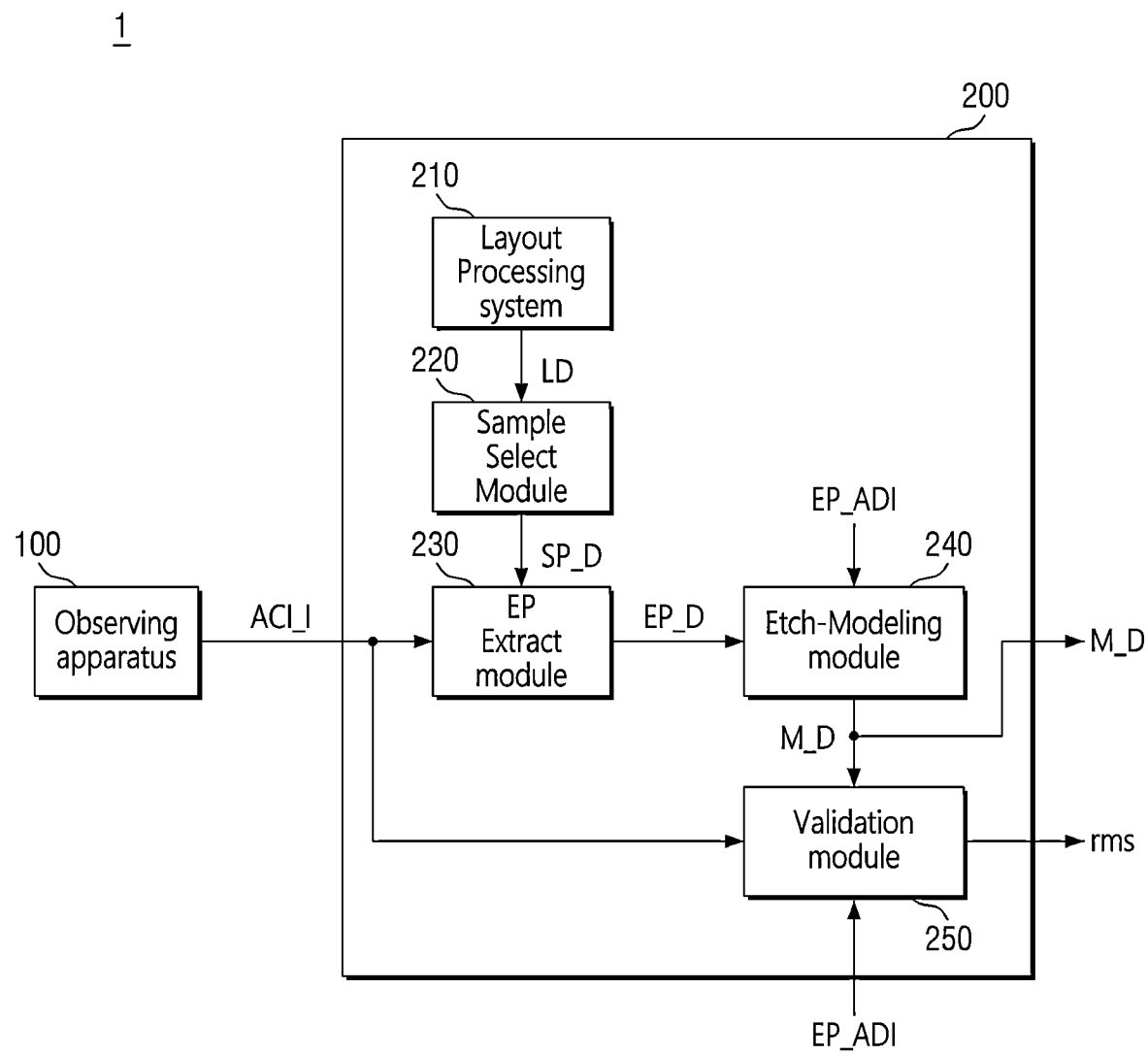
FIG. 1 is a block diagram illustrating an etch-modeling system according to some example embodiments of inventive concepts.

Hereinafter, some example embodiments according to the technical spirit of inventive concepts will be described with reference to the accompanying drawings. In the descriptions of FIGS. 1 to 18, substantially the same elements are denoted by the same reference numerals, and overlapping descriptions of the elements will be omitted. Throughout several drawings of inventive concepts, like reference numerals are used for like elements.

As used herein, the term "module" and/or "system" may include a unit implemented in hardware, software, or firmware and may be used interchangeably with other terms such as "logic," "logic block," "part," and "circuitry." A module may be a single integral element or a minimum unit or a part thereof adapted to perform one or more functions. For example, according to an embodiment, a module may be implemented in the form of an application-specific integrated circuit (ASIC).

Figure 2:
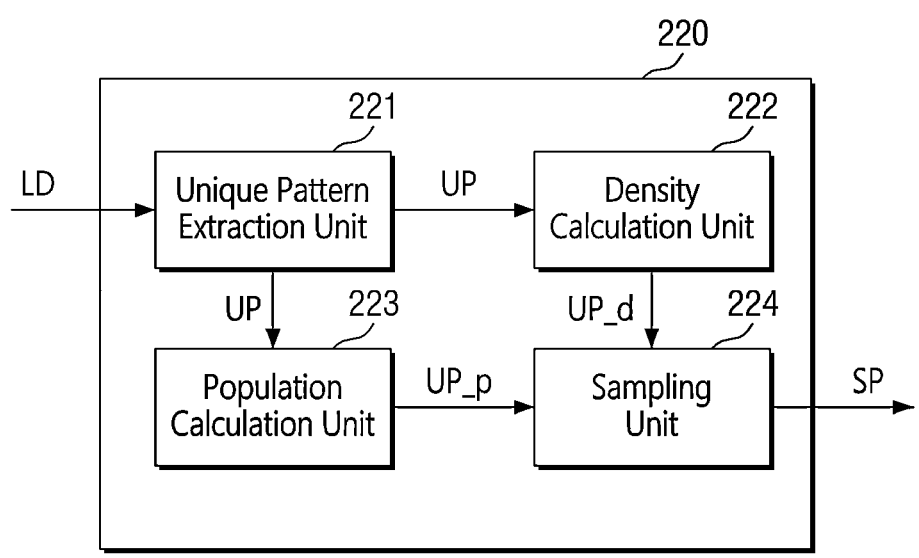
FIG. 2 is a block diagram illustrating a sample select module according to some example embodiments of inventive concepts.

FIG. 1 is a block diagram illustrating an etch-modeling system according to some example embodiments of inventive concepts. FIG. 2 is a block diagram illustrating a sample select module according to some example embodiments of inventive concepts.

Referring to FIGS. 1 and 2, an etch-modeling system 1 may include an observing apparatus 100 and a modeling apparatus 200.

The observing apparatus 100 may image a substrate on which a pattern is formed. The observing apparatus 100 according to some example embodiments of inventive concepts may image a semiconductor substrate or an etched semiconductor substrate. An image I of a semiconductor substrate captured by the observing apparatus 100 may be a scanning electron microscope (SEM), such as a critical-dimension SEM (CDSEM), image or an intensity map image, and for convenience of description, the image I of the semiconductor substrate is referred to as an "SEM image." However, example embodiments according to the technical spirit of inventive concepts are not limited thereto.

The observing apparatus 100 may be in the same facility, e.g. a cleanroom, wherein the pattern is formed; alternatively the observing apparatus 100 may be in another facility, e.g. a laboratory, in a location different from where the pattern is formed. Still further the modeling apparatus 200 may be in the same facility, e.g. the cleanroom, wherein the pattern is formed; alternative the modeling apparatus 200 may be in another facility, e.g. in a location different from where the pattern is formed.

According to a subject to be imaged by the observing apparatus 100, the SEM image I may be, or correspond to, an after cleaning inspection (ACI) image and/or an after development inspection (ADI) image. When the observing apparatus 100 provides the SEM image I to the modeling apparatus 200 for an etch-modeling operation, the SEM image I may be an ACI SEM image ACI_I. When an imaging operation is performed, a pattern formed on the substrate may be a photoresist pattern and/or a target pattern (e.g. a hardmask target pattern) formed with a photoresist pattern.

The observing apparatus 100 according to some example embodiments may include an electron gun to capture the ACI SEM image ACI_I. The electron gun may be implemented as at least one of a thermionic electron gun, a field emission electron gun, or the like, and the ACI SEM image ACI_I may be or include features of between 2 nm to 10 nm. The ACI SEM image ACI_I may be in an appropriate format, such as but not limited to a JPEG format, and/or a TIFF format, and/or a bitmap format. However, the technical spirit of inventive concepts is not limited to the above example embodiments.

The modeling apparatus 200 may include a layout processing system 210, a sample select module 220, an edge placement (EP) extract module 230, an etch-modeling module 240, and a validation module 250.

The layout processing system 210 may provide layout data LD of a plurality of target patterns that are formed on the substrate, which is or will be a subject of etch modeling, and/or layout data LD of mask patterns for forming the plurality of target patterns to the sample select module 220. According to an example embodiment, the layout data LD may be data reflecting optical proximity correction. The layout data LD may be formatted in an appropriate format, such as but not limited to a graphic design system (GDSII) and/or another appropriate format. The technical spirit of inventive concepts is not limited to the form of layout data.

The layout processing system 210 may be disposed in the modeling apparatus 200 to provide the layout data LD to the sample select module 220. According to some example embodiments, however, the layout processing system 210 may be disposed outside the modeling apparatus 200 to provide the layout data LD to the sample select module 220 through a direct (e.g., wired) communication channel and/or a wireless communication channel.

The sample select module 220 may include a unique pattern extraction unit 221, a density calculation unit 222, a population calculation unit 223, and a sampling unit 224.

The unique pattern extraction unit 221 may extract a plurality of unique patterns, e.g. uniquely shaped and/or uniquely sized and/or uniquely oriented patterns, for implementing a plurality of patterns in the layout data LD from the layout data LD, and may extract a plurality of pieces of unique pattern data regarding the plurality of unique patterns.

Each of the unique patterns may be or corresponds to a pattern set which has a unique form (such as at least one of a unique shape, a unique size, or a unique orientation) and includes a single short pattern or a plurality of short patterns. The plurality of patterns representing the layout data LD may be implemented as a plurality of unique patterns UP extracted by the unique pattern extraction unit 221.

Some unique patterns UP may have a unique form, such as an align mark, and/or a unique form in which a plurality of short patterns are gathered.

Accordingly, the unique pattern extraction unit 221 according to some example embodiments may extract unique pattern data on the unique patterns UP and may provide the unique pattern data to the density calculation unit 222 and the population calculation unit 223.

The density calculation unit 222 may calculate a density value UP_d of each of the unique patterns UP. The density values UP_d are indicators representing characteristics of the unique patterns UP, and each of the density values UP_d is or corresponds to a ratio, e.g. an area actually occupied by all patterns in each of the unique patterns UP compared to the area of a region including all patterns in each of the unique patterns UP. The density value UP_d may not have a unit and may be represented as a percentage, or a ratio, or a percentile, according to some example embodiments.

The density calculation unit 222 may provide data of a plurality of density values UP_d for the plurality of unique patterns UP to the sampling unit 224.

The population calculation unit 223 may calculate a population UP_p of each of the unique patterns UP (e.g. may calculate a count or a number of instances of each of the unique patterns UP), calculate a population (e.g. a count or a number of instances) of each of the unique patterns UP in the layout data LD, and provide data of the plurality of populations UP_p of the plurality of unique patterns UP to the sampling unit 224.

The sampling unit 224 may receive the data of the density values UP_d and the populations UP_p of the plurality of unique patterns UP for implementing the layout data LD and may classify the plurality of unique patterns UP into a plurality of groups by grouping the plurality of unique patterns UP on the basis of the data of the density values UP_d.

In each group, the sampling unit 224 may perform sampling by selecting some unique patterns, e.g. a subset of the unique patterns and not all of the unique patterns, on the basis of certain rules for the density values UP_d and the populations UP_p. The sampling unit 224 may sample a plurality of patterns SP corresponding to the selected unique patterns from the layout data LD, and may provide data of the sampled patterns SP to the EP extract module 230.

The sampling unit 224 may perform a random sampling procedure to select some unique patterns. For example, the sampling unit 224 may sample unique patterns based on a random-number generated, and/or based on a hash function. However, example embodiments are not limited thereto.

The EP extract module 230 may receive the ACI SEM image ACI_I from the observing apparatus 100, receive sampled pattern data SP_D from the sample select module 220, and extract an SEM image of the sampled patterns SP from the ACI SEM image ACI_I.

The EP extract module 230 may extract EP data EP_D, which is or corresponds to contour data representing the edge of the sampled patterns SP, from the SEM image of the sampled patterns SP, and the EP data EP_D may be represented as coordinate data. The EP extract module 230 may provide the EP data EP_D to the etch-modeling module 240.

The etch-modeling module 240 may receive the EP data EP_D from the EP extract module 230, receive ADI EP data EP_ADI of the ADI SEM image, which is an SEM image before etching is performed and may include an image of photoresist, and perform etch modeling on the basis of the EP data EP_D and the ADI EP data EP_ADI to generate and provide modeling data M_D to the validation module 250 and/or to a semiconductor manufacturing equipment (not shown) including etching equipment.

The modeling data M_D may indicate an open ratio which represents an average density value of the plurality of patterns in the layout data LD and/or interval data between the plurality of patterns in the layout data LD.

The validation module 250 may receive arbitrary ADI EP data EP_ADI and the modeling data M_D to perform an etching simulation, and may compare a result of the etching simulation with an ACI SEM image ACI_I, which is a result of an etching operation, to generate an effective validation value. The effective valuation value may be a value such as a root mean square (RMS), for example a value representing the square root of the squared difference between the ACI SEM image ACI_I and the etching simulation, and may validate a modeling operation of the etch-modeling module 240.

Figure 3:
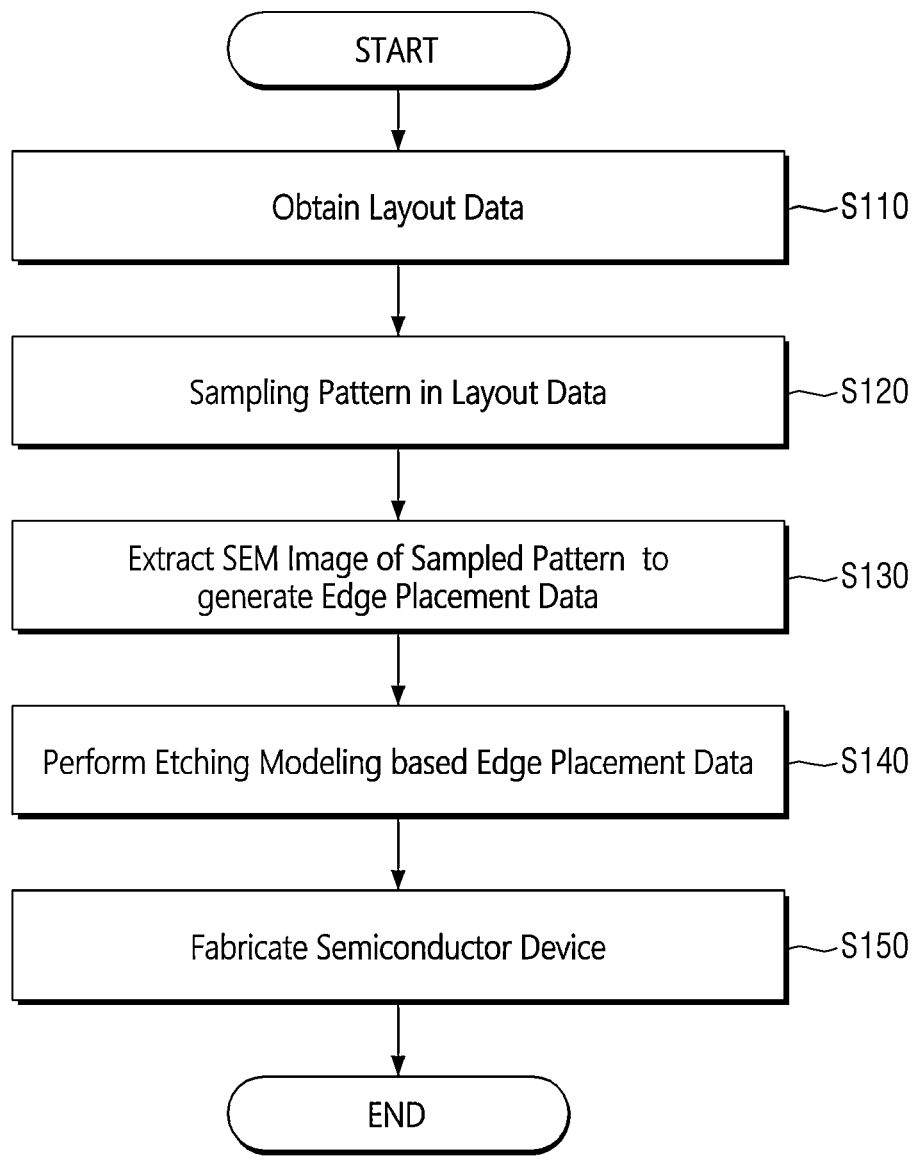
FIG. 3 is a flowchart illustrating a method of manufacturing a semiconductor device according to some example embodiments of inventive concepts.
Figure 4:
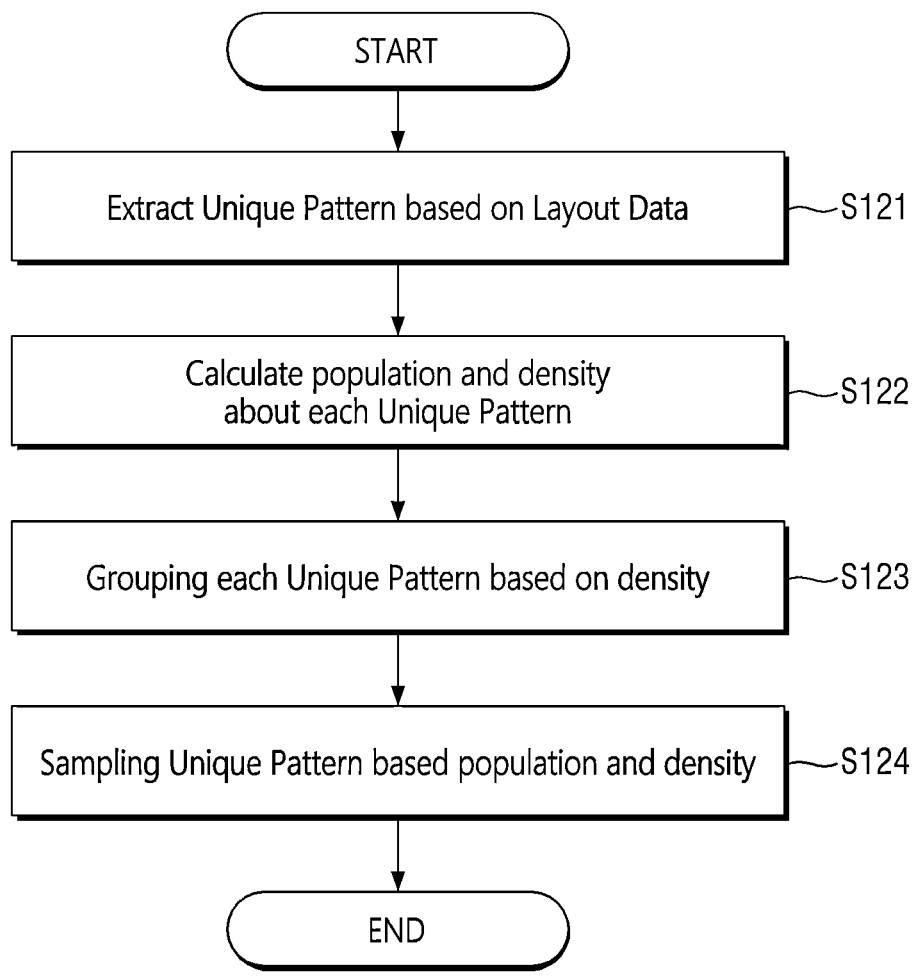
FIG. 4 is a flowchart illustrating a sampling operation of the sample select module according to some example embodiments of inventive concepts.

FIG. 3 is a flowchart illustrating a method of manufacturing a semiconductor device according to some example embodiments of inventive concepts. FIG. 4 is a flowchart illustrating a sampling operation of the sample select module according to some example embodiments of inventive concepts. FIGS. 5 to 8 are diagrams and graphs illustrating a sampling operation of the sample select module according to some example embodiments of inventive concepts.

Referring to FIGS. 1, 3, and 4, the layout processing system 210 may provide layout data LD to the sample select module 220, and the sample select module 220 may receive the layout data LD including pattern data on a plurality of patterns (S110).

The sample select module 220 performs sampling on the plurality of patterns in the layout data LD (S120). The unique pattern extraction unit 221 extracts a plurality of unique patterns on the basis of the layout data LD (S121).

Figure 5:
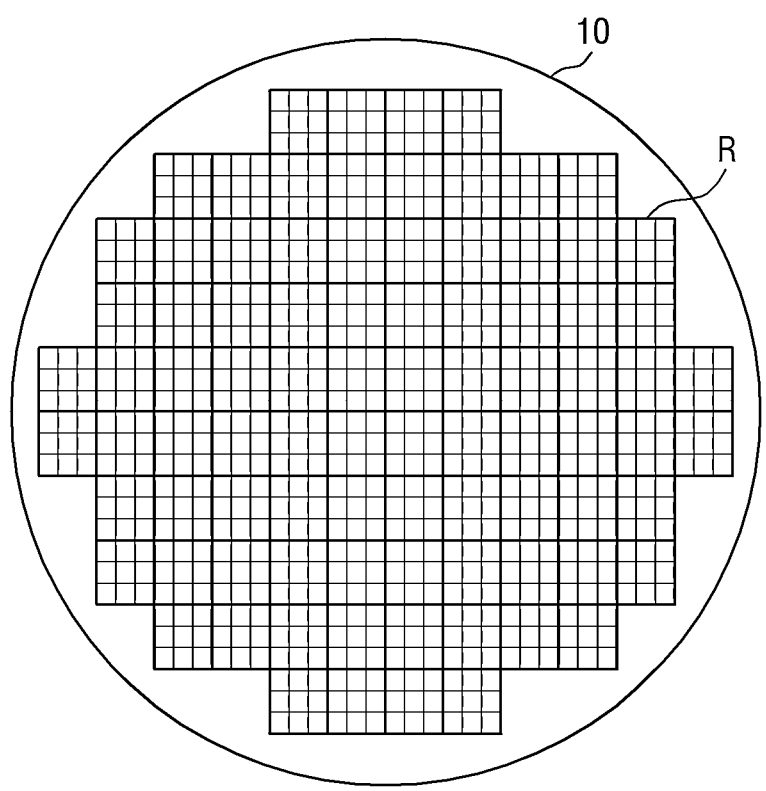
FIGS. 5 to 8 are diagrams and graphs illustrating a sampling operation of the sample select module according to some example embodiments of inventive concepts.
Figure 6:
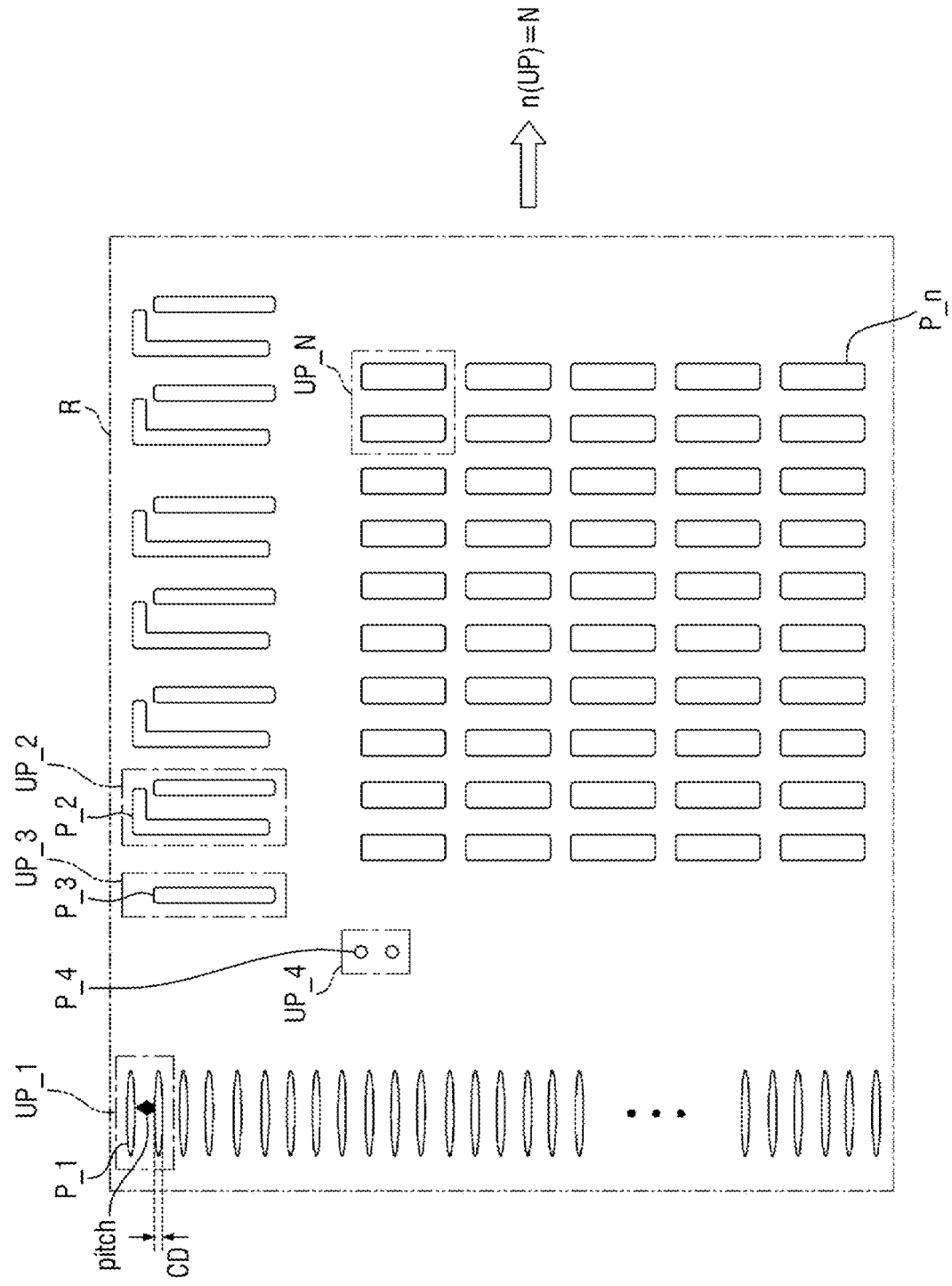

Referring to FIGS. 5 and 6 further, the sample select module 220 may perform a sampling operation on a plurality of patterns to be disposed in a layout region R on a semiconductor substrate 10. The semiconductor substrate 100 may be a wafer, for example may be a 200 mm wafer, a 300 mm wafer, or a 450 mm wafer; however, example embodiments are not limited thereto. The semiconductor substrate 100 may be a silicon substrate or a silicon-on-insulator (SOI) substrate or a gallium-arsenide substrate or another commonly used substrate; however, example embodiments are not limited thereto. For convenience of description, the layout region R is shown as a partial region of the semiconductor substrate 10. However, considering that an etching operation may be performed in units of a wafer, the layout region R may indicate the entire semiconductor substrate 10. Furthermore, although the layout region R only includes a plurality of die (not labeled) and does not extend to the edge of the substrate 100, this is for illustrative purposes only, and example embodiments are not limited thereto. Furthermore, the die may or may not be square-shaped.

Within the layout region R, for example within a region of one of the plurality of dies in the layout region R, the layout data LD may include first to $n^{th}$ patterns P_1 to P_n (n is a natural number greater than or equal to two), and the first to $n^{th}$ patterns P_1 to P_n may be implemented as first to $N^{th}$ unique patterns UP_1 to UP_N (N is a natural number greater than or equal to two). According to an example embodiment, n and N may be different natural numbers.

In the following process, the first to $n^{th}$ patterns P_1 to P_n may be formed using an extreme ultraviolet (EUV) patterning technology. Accordingly, a critical dimension (CD) of the first patterns P_1 among the first to $n^{th}$ patterns P_1 to P_n in the layout data LD may be 3 nm to 4 nm, and a pitch between the first patterns P1 may also be designed to be 3 nm to 4 nm. However, example embodiments are not limited thereto, and the first to nth patterns P_1 to P_n may be formed using another patterning technology such as a deep ultraviolet (DUV) patterning technology.

The unique pattern extraction unit 221 may extract N unique patterns, for example, the first to $N^{th}$ unique patterns UP_1 to UP_N from the first to $n^{th}$ patterns P_1 to P_n in the layout data LD.

The first unique pattern UP_1 may include the plurality of first patterns P_1, the second unique pattern UP_2 may include the second pattern P_2 and the third pattern P_3, the third unique pattern UP_3 may include the third pattern P_3, and the $N^{th}$ unique pattern UP_N may include the plurality of $n^{th}$ patterns P_n. The inclusion relation is illustrative and intended to facilitate description, and the technical spirit of inventive concepts is not limited to the inclusion relation.

Different unique patterns may have a difference in at least one of a structure, a size, an orientation, and a contour profile; however, example embodiments are not limited thereto. For example, different unique patterns may be dissimilar and/or may not be congruent; however, example embodiments are not limited thereto.

The unique pattern extraction unit 221 may provide data of the extracted first to $N^{th}$ unique patterns UP_1 to UP_N to the density calculation unit 222 and the population calculation unit 223.

Figure 7:
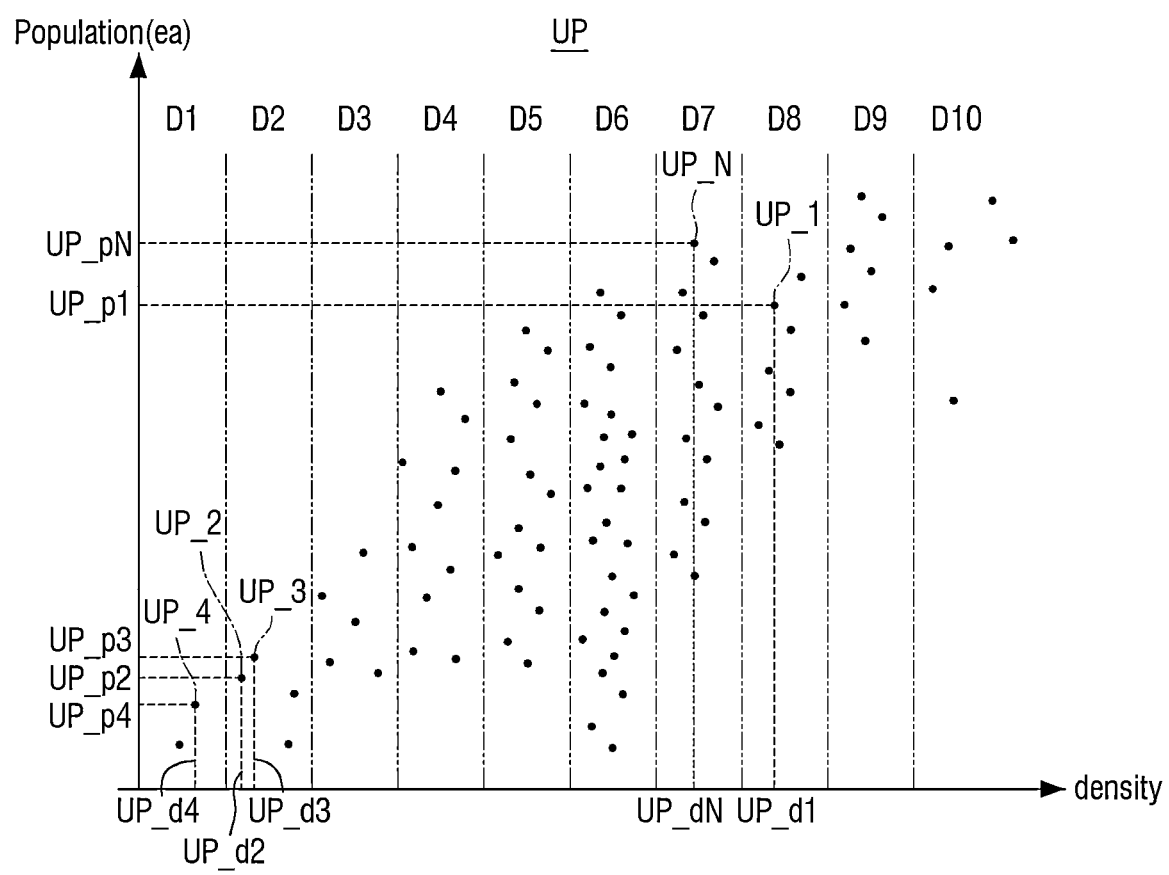

FIG. 7 is a graph showing density values UP_d and populations UP_p of the first to $N^{th}$ unique patterns UP_1 to UP_N. Referring to FIG. 7 further, the density calculation unit 222 calculates first to $N^{th}$ density values UP_d1 to UP_dN (e.g. a ratio of open areas to pattern areas) of the extracted first to $N^{th}$ unique patterns UP_1 to UP_N, and the population calculation unit 223 calculates first to $N^{th}$ populations UP_p1 to UP_pN of the first to $N^{th}$ unique patterns UP_1 to UP_N (S122).

The density calculation unit 222 may provide data of the first to $N^{th}$ density values UP_d1 to UP_dN to the sampling unit 224, and the population calculation unit 223 may provide data of the first to $N^{th}$ populations UP_p1 to UP_pN to the sampling unit 224.

The sampling unit 224 may classify the first to $N^{th}$ unique patterns UP_1 to UP_N into first to tenth density groups D1 to D10 on the basis of the first to $N^{th}$ density values UP_d1 to UP_dN (S123). The patterns may be classified into ten groups by means of example, and the number of groups may vary depending on example embodiments. The number of groups is a natural number greater than or equal to two.

As an example, the first unique pattern UP_1 may be classified into the eighth density group D8, the second unique pattern UP_2 may be classified into the second density group D2, the third unique pattern UP_3 may be classified into the third density group D3, and the fourth unique pattern UP_4 may be classified into the first density group D1.

Since density values may be indicators representing characteristics of unique patterns, the etch-modeling system 1 can increase the reliability of etch modeling by grouping unique patterns having similar pattern characteristics through a grouping and/or classification operation based on the density values, and then sampling a combination of unique patterns similar to actual patterns.

The sampling unit 224 may perform a sampling operation on the basis of the first to $N^{th}$ density values UP_d1 to UP_dN and the first to $N^{th}$ populations UP_p1 to UP_pN (S124).

Figure 8:
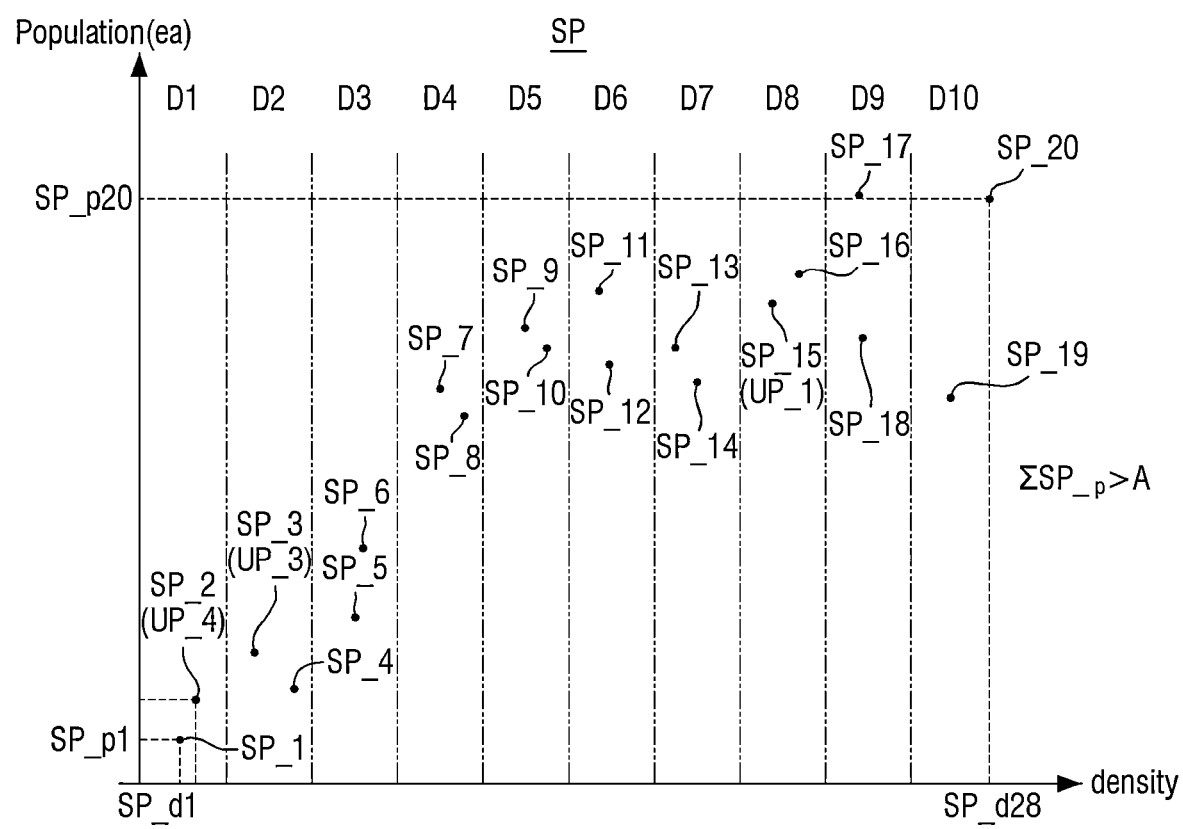

Referring to FIG. 8, the sampling unit 224 according to some example embodiments may select the same number of unique patterns from the first to tenth density groups D1 to D10 as a plurality of sampled patterns. As an example, two unique patterns may be selected from each of the density groups D1 to D10 such that first to twentieth sampled patterns SP_1 to SP_20 may be sampled, and sampled pattern data SP_D may be provided to the EP extract module 230.

For example, the second sampled pattern SP_2 may correspond to the fourth unique pattern UP_4, the third sampled pattern SP_3 may correspond to the third unique pattern UP_3, and the fifteenth sampled pattern SP_15 may correspond to the first unique pattern UP_1. However, example embodiments are not limited thereto.

Alternatively or additionally, the total number of the sampled patterns SP_1 to SP_20 sampled by the sampling unit 224 is required to be larger than a number A. The number A may be predetermined, and/or may be provided to the sampling unit 224, and/or may be determined dynamically by the sampling unit 224. Under this condition, the etch-modeling system 1 may ensure the reliability of a modeling operation. When the sampled patterns SP_1 to SP_20 do not satisfy the condition related to the total number, the sampling unit 224 may repeat sampling.

Figure 9:
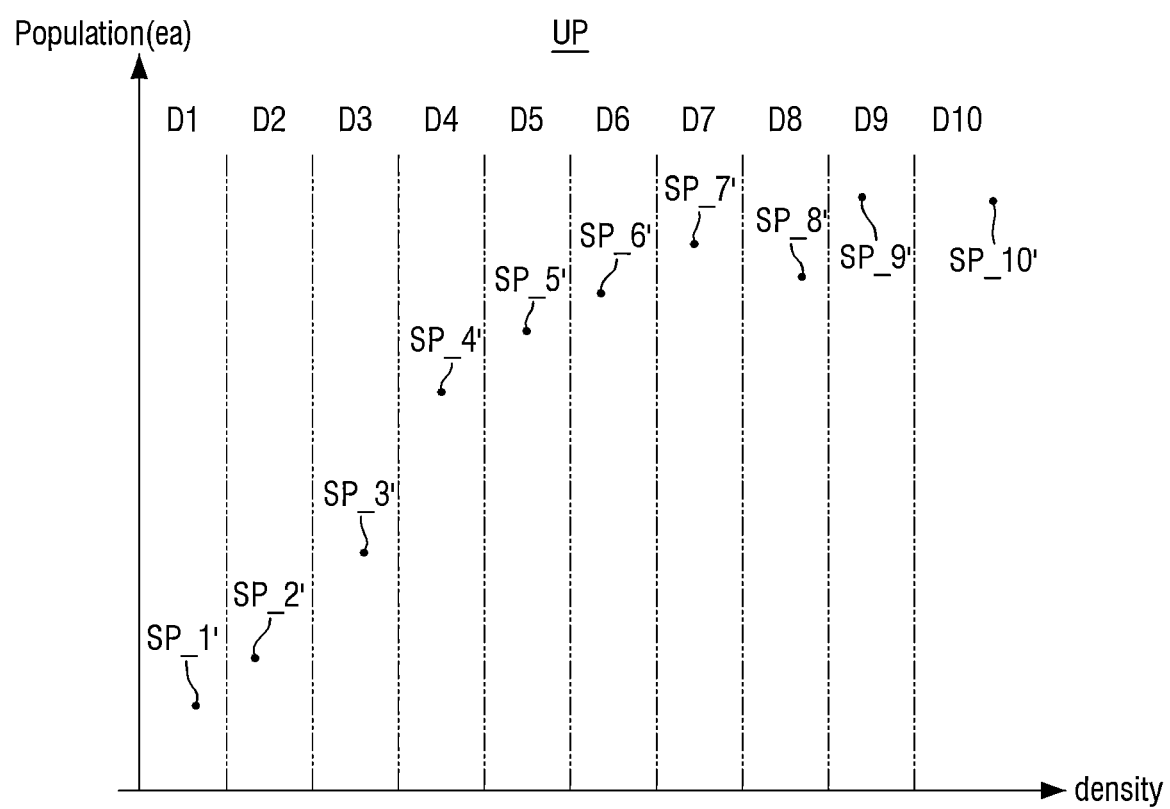
FIG. 9 is a graph illustrating a sampling operation of a sample select module according to some other example embodiments of inventive concepts.
Figure 10:
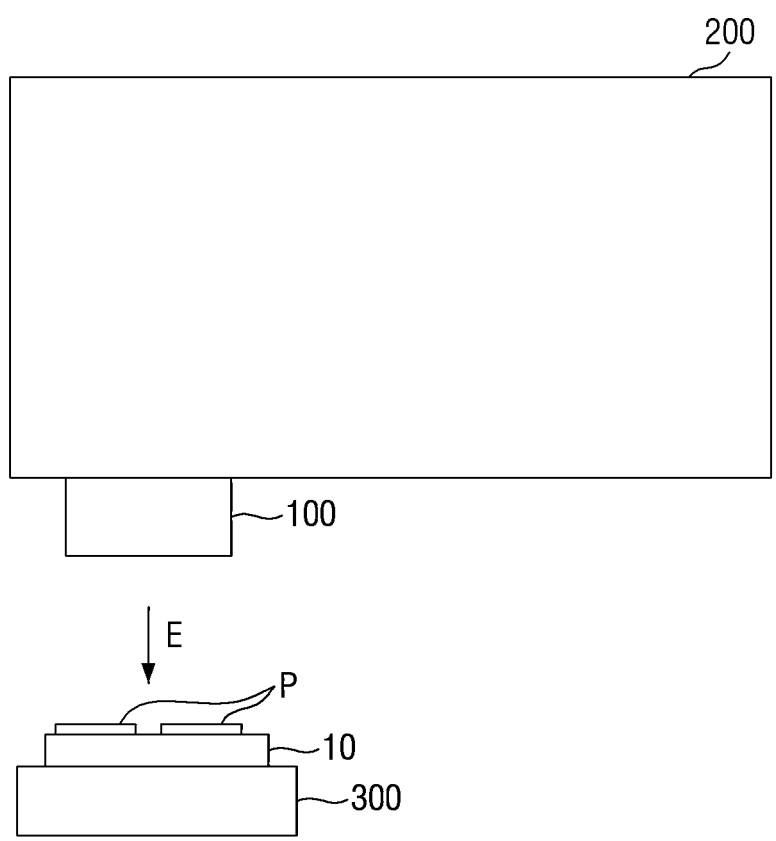
FIGS. 10 to 15 are diagrams illustrating an etch-modeling operation of the method of manufacturing a semiconductor device according to some example embodiments of inventive concepts.

FIG. 9 is a graph illustrating a sampling operation of a sample select module according to some other example embodiments of inventive concepts. Operations of the sample select module according to some other example embodiments of inventive concepts will be described below with reference to FIGS. 7 and 9. Differences from the operations of the sample select module shown in FIG. 8 will be mainly described.

Unlike the sampling unit of FIG. 8, the sampling unit 224 of FIG. 9 may perform sampling by selecting a unique pattern having the largest population count in each of the density groups D1 to D10. Accordingly, first to tenth sampled patterns SP_1' to SP_10' having the largest population count in the first to tenth density groups D1 to D10 may be selected in a sampling operation.

FIGS. 10 to 15 are diagrams illustrating an etch-modeling operation of the method of manufacturing or fabricating a semiconductor device according to some example embodiments of inventive concepts.

Referring to FIGS. 10 to 15, the observing apparatus 100 may emit electron beams E to the semiconductor substrate 10, on which a pattern P is formed, on a stage 300 to image the pattern P. Accordingly, the observing apparatus 100 acquires an ACI SEM image ACI_I of the pattern P and provides the acquired ACI SEM image ACI_I to the modeling apparatus 200.

The pattern P on the semiconductor substrate 10 may be or may include a wafer pattern formed of a photoresist pattern, and thus the SEM image I may be an ACI image. However, the technical spirit of inventive concepts is not limited to the image example. For example, the SEM image I may be an image based on an optical model.

The EP extract module 230 receives the ACI SEM image ACI_I from the observing apparatus 100, receives the sampled pattern data SP_D from the sample select module 220, and extracts the EP data EP_D of the sampled pattern SP on the basis of the ACI SEM image ACI_I and the sampled pattern data SP_D (S130).

Figure 11:
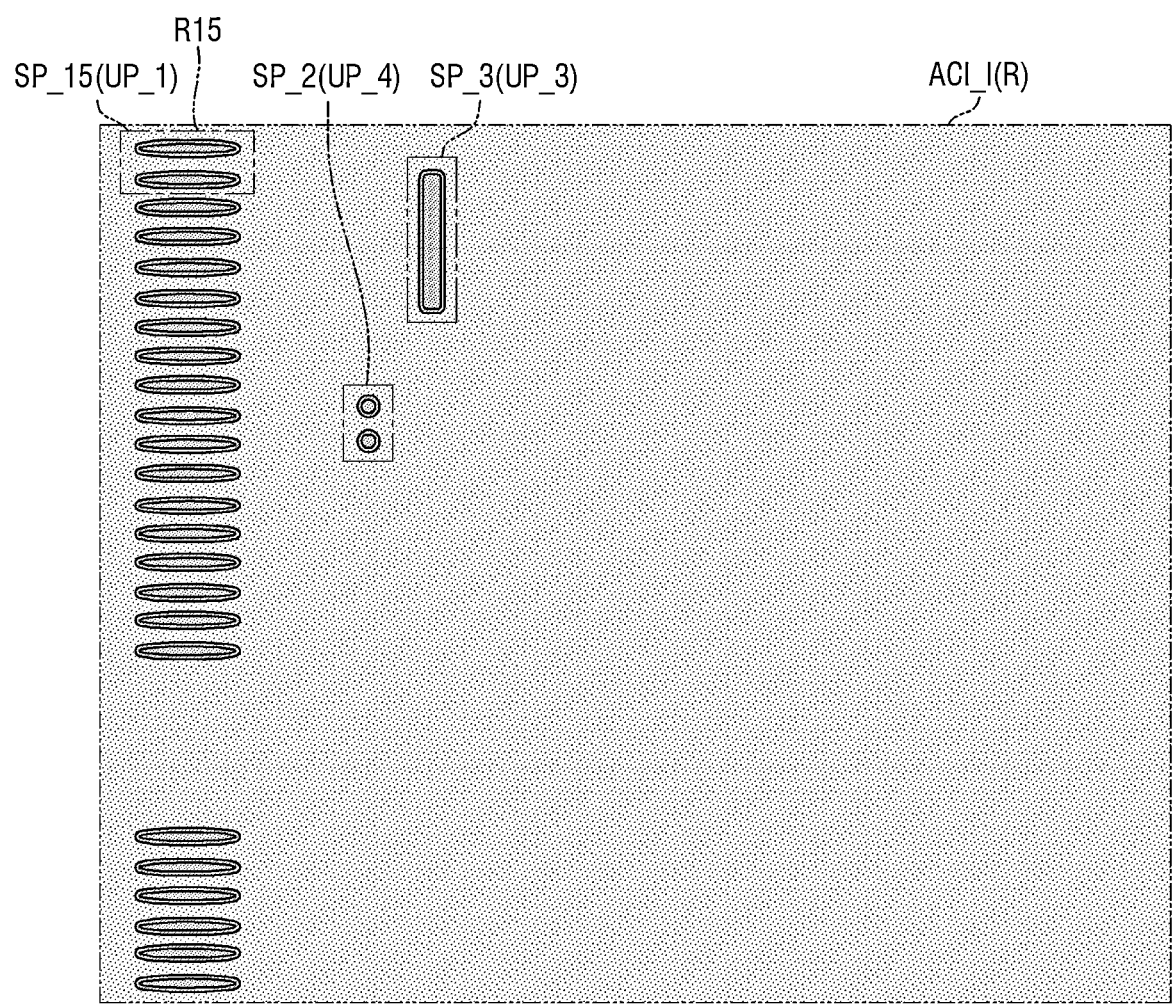
Figure 12:
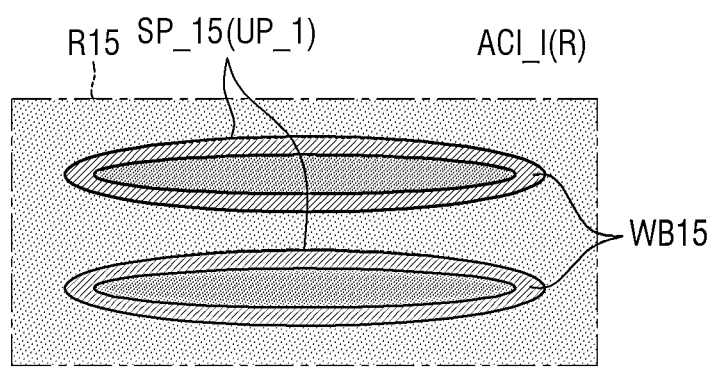
Figure 13:
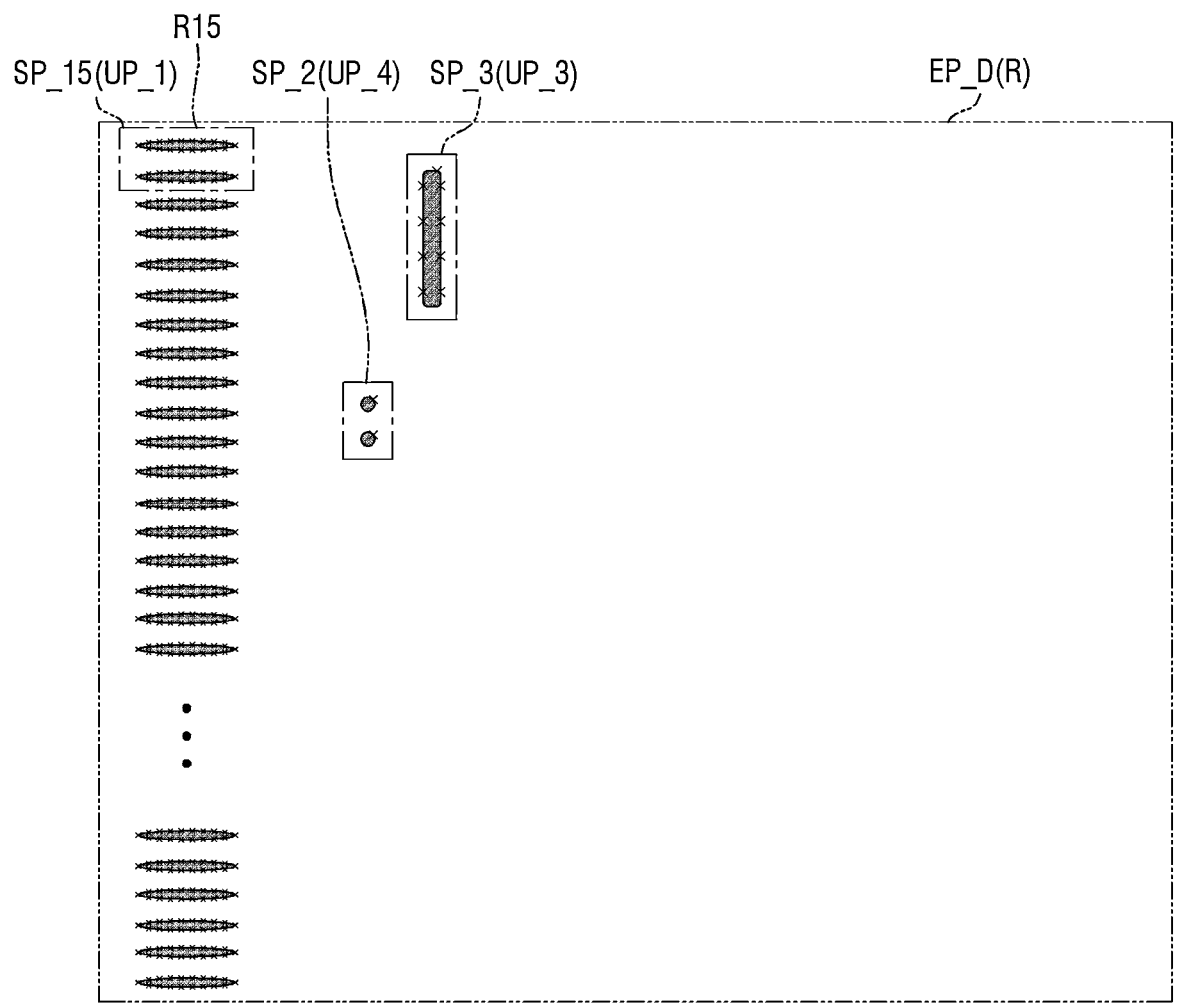
Figure 14:
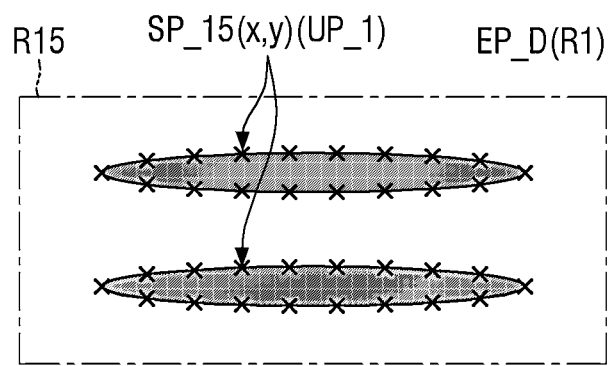

FIG. 11 is a diagram only showing the sampled patterns SP in the ACI SEM image ACI_I, and FIG. 12 is an enlarged view of a fifteenth region R15 of FIG. 11. FIG. 13 is a diagram obtained by extracting EP data from the ACI SEM image ACI_I of FIG. 11, and FIG. 14 is an enlarged view of the fifteenth region R15 of FIG. 13.

Referring to FIGS. 11 to 14, the fifteenth sampled pattern SP_15 corresponds to the first unique pattern UP_1, and corresponds to the plurality of first patterns P_1 of FIG. 6. All patterns in the fifteenth sampled pattern SP_15 may be included in the fifteenth region R15, and a density value SP_d15 of the fifteenth sampled pattern SP_15 may be a percentage or a ratio of an actual area occupied by the fifteenth sampled pattern SP_15 in the fifteenth region R15 to the area of the fifteenth region R15.

In the ACI SEM image ACI_I, the fifteenth sampled pattern SP_15 represents the edge of the fifteenth sampled pattern SP_15 and may include a white band WB15 that is a region in which contrast is changed. The EP extract module 230 may extract EP data EP_D of the fifteenth sampled pattern SP_15 through the fifteenth white band WB15.

In some example embodiments, the EP extract module 230 may represent and store the EP data EP_D of the fifteenth sampled pattern SP_15 in two dimensions, for example, in the form of (x coordinate, y coordinate), and provide the EP data EP_D to the etch-modeling module 240.

Since the extraction operation is applied to other sampled patterns in the same way, descriptions of other sampled patterns are replaced with the extraction operation for the fifteenth sampled patterns SP_15.

Figure 15:
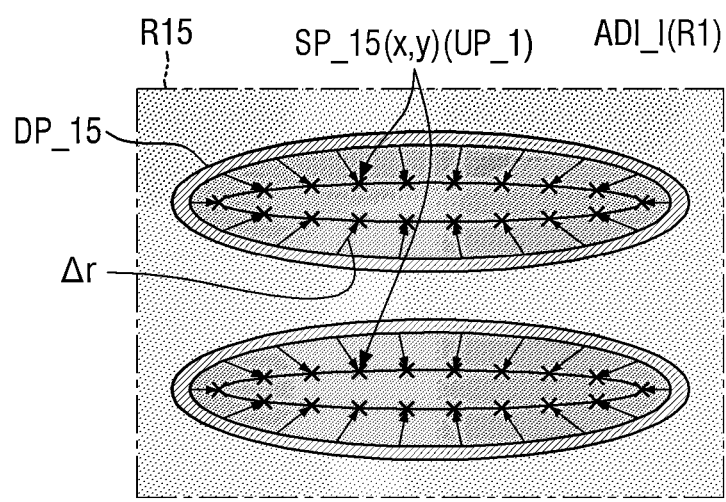

FIG. 15 is a diagram illustrating ADI EP data EP_ADI corresponding to the fifteenth sampled pattern SP_15 and EP data of the fifteenth sampled pattern SP_15.

The etch-modeling module 240 performs etch modeling on the basis of the EP data EP_D (S140). Referring to FIG. 15, the etch-modeling module 240 may perform etch modeling by causing contour data of the fifteenth sampled pattern SP_15 and contour data of a fifteenth developed pattern DP_15 in the ADI EP data EP_ADI corresponding to the fifteenth sampled pattern SP_15 to correspond to each other, e.g. on a one-to-one basis.

Modeling may be performed on the basis of the EP data EP_D and displacement differences Δr between the pieces of contour data corresponding to the EP data such that the modeling data M_d including an average density value, an average open ratio, or the like, which is a parameter input from the semiconductor manufacturing equipment, may be generated.

Referring back to FIG. 3, a semiconductor device may be fabricated on the basis of the etch modeling generated by the etch-modeling model 2450 (S150).

Figure 16:
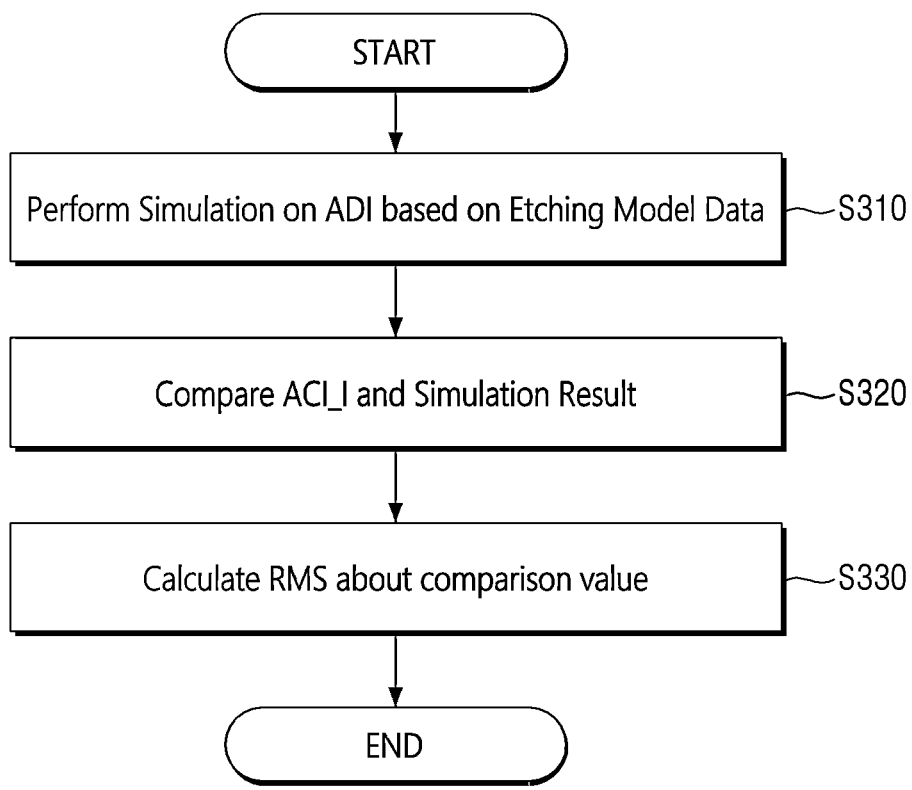
FIG. 16 is a flowchart illustrating an etching model validation operation of the method of manufacturing a semiconductor device according to some example embodiments of inventive concepts.
Figure 17:
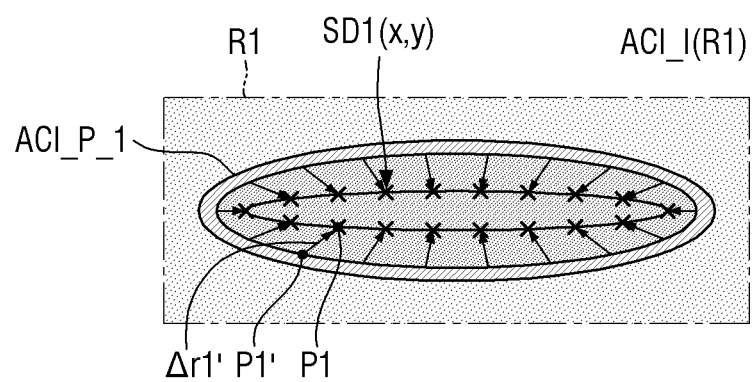
FIGS. 17 and 18 are a diagram and graphs illustrating the etching model validation operation of the method of manufacturing a semiconductor device according to some example embodiments of inventive concepts.
Figure 18:
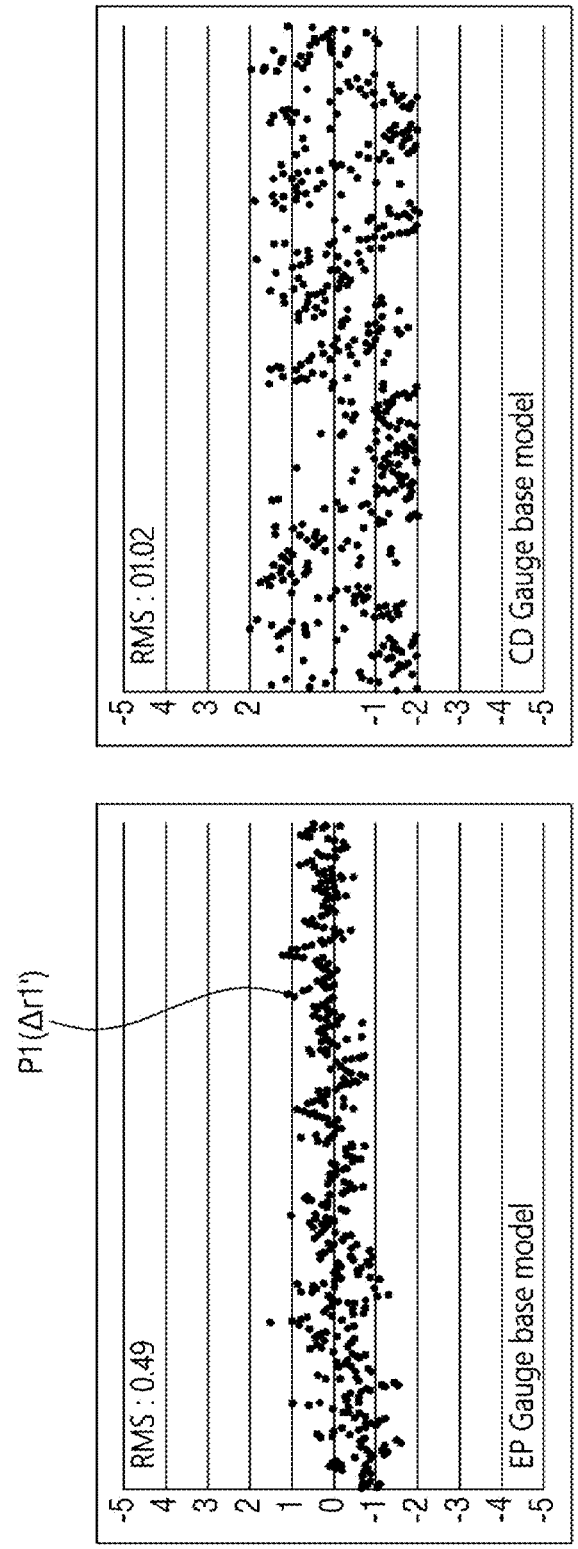

FIG. 16 is a flowchart illustrating an etching model validation operation of the method of manufacturing a semiconductor device according to some example embodiments of inventive concepts. FIGS. 17 and 18 are a diagram and graphs illustrating the etching model validation operation of the method of manufacturing a semiconductor device according to some example embodiments of inventive concepts.

Referring to FIGS. 16 to 18, the validation module 250 may receive arbitrary ADI EP data EP_ADI and the modeling data M_D and perform an etching simulation (S310).

The validation module 250 may be set to an average density value or an average open ratio to perform an etching simulation operation on the arbitrary ADI EP data EP_ADI and generate simulation data SD.

The validation module 250 receives an ACI SEM image ACI_I corresponding to the arbitrary ADI EP data EP_ADI and compares the ACI SEM image ACI_I with first simulation data SD1 included in the simulation data SD (S320).

The validation module 250 causes contour data of an arbitrary first point P1 in the first simulation data SD1 and contour data of a first ACI point P1', which corresponds to the first point P1, in a first ACI pattern ACI_P_1 of the ACI SEM image ACI_I to correspond to each other, e.g. on a one-to-one basis, generates displacement differences Δr1' between the pieces of contour data, and calculates a value such as an RMS value on the basis of the plurality of generated displacement difference values (S330). The smaller the RMS value, the more consistent the ACI SEM image ACI_I and the simulation result.

An RMS generated by an EP gauge base model, which is generated by the etch-modeling system 1 of inventive concepts, is 0.49. An RMS generated by a CD gauge base model, which does not have the technical characteristics of inventive concepts, that is, which does not perform the sampling operation, is 1.02. Thus, it may be possible to see that modeling data generated by the etch-modeling system 1 of inventive concepts has high or improved reliability.

The etch-modeling system 1 of inventive concepts performs modeling to reflect an etching environment of actual patterns by sampling target patterns to be actually fabricated in consideration of a density value, which is a pattern characteristic, and the total number of patterns, thereby increasing the reliability. Also, the etch-modeling system 1 can increase the reliability by performing modeling on the basis of EP data.

Alternatively or additionally, when etch modeling is performed through the etch-modeling system 1 of inventive concepts, it may be unnecessary to separately form a pattern for modeling. Since it is unnecessary to fabricate a modeling mask, it may be more efficient in terms of cost.

As used herein, the term "module" or "system" may include a unit implemented in hardware, software, or firmware and may be interchangeably used with other terms such as "logic," "logic block," "part," or "circuitry." A module may be a single integral element or a minimum unit or a part thereof adapted to perform one or more functions. For example, according to an embodiment, a module may be implemented in the form of an ASIC.

The method of inventive concepts may be included and provided in a computer program product. The computer program product may be traded as a product between a seller and a buyer. The computer program product may be distributed in the form of a machine-readable storage medium (e.g., a universal serial bus (USB) medium) or distributed (downloaded or uploaded) online or between two user devices (e.g., smart phones) directly. When distributed online, at least a part of the computer program product may be temporarily generated or at least temporarily stored in the machine-readable storage medium such as memory of the manufacturer's server, a server of the application storage, or a relay server.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Some example embodiments have been disclosed herein, and although specific terms are employed, they are used and are to be interpreted in a generic and descriptive sense only and not for purpose of limitation. In some instances, as would be apparent to one of ordinary skill in the art, features, characteristics, and/or elements described in connection with a particular example embodiment may be used singly or in combination with features, characteristics, and/or elements described in connection with other embodiments unless otherwise specifically indicated. Furthermore example embodiments described herein are not necessarily mutually exclusive. For example, some example embodiments may include features associated with a first figure, and also may include features associated with another figure. Accordingly, it will be understood by those of skill in the art that various changes in form and details may be made without departing from the spirit and scope of example embodiments as set forth in the following claims.

What is claimed is:

1. A method of fabricating a semiconductor device, the method comprising:
   receiving layout data including a plurality of pieces of pattern data, the plurality of pieces of pattern data having through first to $N^{th}$ unique patterns (N is a natural number greater than or equal to two);
   calculating first to $N^{th}$ density values of the first to $N^{th}$ unique patterns from the layout data and calculating first to $N^{th}$ populations of the first to $N^{th}$ unique patterns from the layout data;
   performing sampling by selecting some unique patterns among the first to $N^{th}$ unique patterns, the selecting based on the first to $N^{th}$ density values and the first to $N^{th}$ populations;
   performing etch modeling on sampled patterns of the plurality of pieces of pattern data, the sampled patterns corresponding to the selected unique patterns,
   performing an etching simulation operation on after development inspection (ADI) scanning electron microscope (SEM) image data, the etching simulation operation based on modeling data, the modeling data being a result of the etch modeling, and
   validating the etch modeling by comparing a result of the etching simulation operation with an after cleaning inspection (ACI) SEM image wherein the comparing the result of the etching simulation operation with an ACI SEM image includes
      generating displacement differences between the result of the etching simulation operation and the ACI SEM image, and
      calculating a root mean squared (RMS) value on the basis of the generated displacement differences.

2. The method of claim 1, further comprising:
   classifying the first to $N^{th}$ unique patterns into a plurality of density groups by density value.

3. The method of claim 2, wherein the performing of the sampling comprises performing a first sampling operation by selecting the unique pattern having the largest population in each of the plurality of density groups.

4. The method of claim 2, wherein the performing of the sampling comprises performing a second sampling operation by selecting a same number of unique patterns in each of the plurality of density groups, and
   a total number of unique patterns selected by the second sampling operation is larger than a provided number.

5. The method of claim 1, wherein the first unique pattern includes a first pattern and a second pattern having pattern shapes identical to each other, and
   the second unique pattern includes a third pattern and a fourth pattern having different pattern shapes from each other.

6. The method of claim 1, further comprising:
   extracting an after cleaning inspection (ACI) scanning electron microscope (SEM) image of the sampled patterns.

7. The method of claim 6, wherein the performing of the etch modeling comprises:
   extracting edge placement (EP) data, the EP data corresponding to an edge of the ACI SEM image; and
   receiving an after development inspection (ADI) SEM image of the sampled patterns and performing the etch modeling based on the EP data and the ADI SEM image.

8. The method of claim 1, wherein the ADI SEM image data is edge placement (EP) data corresponding to an edge of an ADI SEM image.

9. The method of claim 1, wherein the comparing the result of the etching simulation operation with an ACI SEM image includes causing contour data of the result of the etching simulation to correspond with contour data of the ACI SEM image on a one-to-one basis.

10. The method of claim 1, wherein a total number of the sampled patterns is dynamically determined by a sampling unit.

11. A method of fabricating a semiconductor device, the method comprising:
    receiving an after cleaning inspection (ACI) scanning electron microscope (SEM) image of a plurality of patterns, the plurality of patterns having first to $N^{th}$ unique patterns (N is a natural number greater than or equal to two);
    performing sampling by selecting some unique patterns from among the first to $N^{th}$ unique patterns;
    extracting edge placement (EP) data, the
    EP data corresponding to an edge of the ACI SEM image, the extracting from sampled patterns of the plurality of patterns corresponding to the selected unique patterns;
    performing etch modeling on the EP data, and
    validating the etch modeling by
       generating displacement differences between a result of an etching simulating operation and the ACI SEM image, and
       calculating a root mean squared (RMS) value on the basis of the generated displacement differences.

12. The method of claim 11, further comprising:
    receiving layout data including a plurality of pieces of pattern data corresponding to the plurality of patterns; and
    calculating first to $N^{th}$ density values of the first to $N^{th}$ unique patterns and first to $N^{th}$ populations of the first to $N^{th}$ unique patterns from the layout data,
    wherein the sampling is performed based on the first to $N^{th}$ density values and the first to $N^{th}$ populations.

13. The method of claim 12, further comprising:
    classifying the first to $N^{th}$ unique patterns into a plurality of density groups by density value.

14. The method of claim 13, wherein the performing of the sampling comprises performing a first sampling operation by selecting the unique pattern having a largest population count in each of the plurality of density groups.

15. The method of claim 11, further comprising:
    receiving an after development inspection (ADI) SEM image of the sampled patterns,
    wherein the etch modeling is performed based on the EP data and the ADI SEM image.

16. The method of claim 11, further comprising:
    performing the etching simulation operation on after development inspection (ADI) SEM image data based on modeling data, the modeling data being a result of the etch modeling.

17. An etch-modeling system comprising:
    a layout processing system configured to provide layout data including a plurality of pieces of pattern data, the plurality of pieces of pattern data including first to $N^{th}$ unique patterns (N is a natural number greater than or equal to two); and
    processing circuitry configured to calculate first to $N^{th}$ density values of the first to $N^{th}$ unique patterns and first to $N^{th}$ populations of the first to $N^{th}$ unique patterns by receiving the layout data,
    to perform sampling by selecting some unique patterns among the first to $N^{th}$ unique patterns based on the first to $N^{th}$ density values and on the first to $N^{th}$ populations, to perform etch modeling on sampled patterns of the plurality of pieces of pattern data corresponding to the selected unique patterns, and to validate etch modeling by generating displacement differences between result of an etching operation and an after cleaning inspection (ACI) scanning electron microscope (SEM) image, and calculating a root mean squared (RMS) value on the basis of the generated displacement differences.

18. The etch-modeling system of claim 17, wherein the processing circuitry is configured to classify the first to $N^{th}$ unique patterns into a plurality of density groups by density value.

19. The etch-modeling system of claim 18, wherein the processing circuitry is configured to perform a first sampling operation by selecting the unique pattern having a largest population count in each of the plurality of density groups.

20. The etch-modeling system of claim 17, wherein the processing circuitry is configured to extract the first to $N^{th}$ unique patterns from the layout data.

* * * * *